(12) United States Patent
Baggs

(10) Patent No.: US 8,536,513 B2
(45) Date of Patent: Sep. 17, 2013

(54) SPACE-SAVING FLATBED SCANNER

(75) Inventor: Scott Baggs, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2303 days.

(21) Appl. No.: 09/885,900

(22) Filed: Jun. 20, 2001

(65) Prior Publication Data

US 2002/0195542 A1 Dec. 26, 2002

(51) Int. Cl.
*H01L 27/00* (2006.01)

(52) U.S. Cl.
USPC .......................... 250/234; 250/239; 358/488

(58) Field of Classification Search
USPC ...... 395/659; 250/208.1, 234–239; 348/332; 358/474, 497, 498, 505, 488
See application file for complete search history.

(56) References Cited

U.S. PATENT DOCUMENTS

| | | | |
|---|---|---|---|
| 4,709,144 A | 11/1987 | Vincent | 250/226 |
| 4,870,268 A | 9/1989 | Vincent et al. | 250/226 |
| 4,926,041 A | 5/1990 | Boyd | 250/226 |
| 5,038,028 A | 8/1991 | Boyd et al. | 250/208 |
| 5,227,620 A | 7/1993 | Elder, Jr. et al. | 250/208 |
| 5,475,505 A * | 12/1995 | Minasian et al. | 355/25 |
| 5,822,080 A | 10/1998 | Chavez | 358/374 |
| 6,002,508 A | 12/1999 | Mai | 359/212 |
| 6,040,572 A | 3/2000 | Khovaylo et al. | 250/235 |
| 6,131,522 A | 10/2000 | Chavez | 108/90 |
| 6,233,064 B1 * | 5/2001 | Griffin | 358/474 |
| 6,331,886 B2 * | 12/2001 | Nagano et al. | 353/26 R |
| 6,404,515 B1 * | 6/2002 | Onda et al. | 358/474 |
| 6,408,161 B1 * | 6/2002 | Minowa et al. | 399/380 |
| 6,433,941 B1 * | 8/2002 | Onoda | 359/806 |
| 6,661,539 B1 * | 12/2003 | Nee | 358/474 |

FOREIGN PATENT DOCUMENTS

| | | | |
|---|---|---|---|
| JP | 2000-209408 | * | 7/2000 |
| JP | 2000209409 | | 7/2000 |
| JP | 2001-053918 | * | 2/2001 |
| WO | WO 02/39721 | | 5/2002 |

* cited by examiner

*Primary Examiner* — John Lee

(57) ABSTRACT

A space-saving scanner assembly and method are disclosed. The scanner assembly can be manufactured with optical scanning components typical of flatbed scanners. The scanner may be enclosed within a housing a substantially vertical source-contact surface with a channel and a flap coupled to the source-contact surface. The flap having a source-backing surface substantially parallel to the source-contact surface of the housing and arranged such that the source-contact surface, the source-backing surface, and the channel form an opening for receiving an edge of a source document to be scanned. The housing and the flap are configured with a number of features, which permit an operator to easily place a source over a platen forming a portion of the source-contact surface. A method for operating a space-saving scanner is also presented. The method can be broadly summarized by the following steps: providing a scanner with a housing with a substantially vertical source-contact surface and a channel extending therefrom, the vertical source-contact surface including a transparent platen portion, the channel adjacent to a lower edge of the transparent platen; and providing a flap coupled to the source-contact surface, the flap having a source-backing surface substantially parallel to the source-contact surface of the housing, wherein the source-contact surface, the source-backing surface, and the channel form an opening for receiving an edge of a source to be scanned.

19 Claims, 10 Drawing Sheets

SPACE-SAVING FLATBED SCANNER

BACKGROUND OF THE INVENTION

1. Field of the Invention

The present disclosure relates generally to the field of flatbed scanners and more particularly, to a space-saving flatbed scanner.

2. Discussion of the Related Art

Scanner devices, such as flatbed scanners, are well known in the art and produce machine-readable image data signals that are representative of a scanned object, such as a photograph or a page of printed text. In a typical scanner application, the image data signals produced by a scanner may be used by a personal computer to reproduce an image of the scanned object on a suitable display device, such as a monitor or a printer.

A typical flatbed scanner may include illumination and optical systems to accomplish the task of scanning an object. The illumination system illuminates a portion of the object (commonly referred to as a "scan region"). Whereas, the optical system collects light reflected by the illuminated scan region and focuses a small area of the illuminated scan region (commonly referred to as a "scan line") on the surface of a photosensitive detector positioned within the scanner. Image data representative of the entire object may then be obtained by sweeping the scan line across the entire source object, usually by moving the illumination and optical systems with respect to the object being scanned.

By way of example, the illumination system may include a light source (e.g., a fluorescent or incandescent lamp or an array of light emitting diodes (LEDs)). The optical system may include a lens and/or mirror assemblies to focus the image of the illuminated scan line onto the surface of the photosensitive detector. Alternatively, a "contact image sensor" (CIS) may be used to collect and focus light from the illuminated scan region onto the surface of a detector.

The photosensitive detector used to detect the image light focused thereon by the optical system may be a charge-coupled device (CCD), although other devices may be used. A typical CCD may comprise an array of individual cells or "pixels," each of which collects or builds-up an electrical charge in response to exposure of certain wavelengths of light energy. Since the quantity of the accumulated electrical charge in any given cell or pixel is related to the intensity and duration of the light exposure, a CCD may be used to detect light and dark spots on an image focused thereon.

Flatbed scanners and various components thereof are disclosed in U.S. Pat. No. 4,926,041 for OPTICAL SCANNER to David Wayne Boyd; U.S. Pat. No. 4,709,144 for BEAM SPLITTER AND PHOTOSENSOR to Kent J. Vincent; U.S. Pat. No. 4,870,268 for COLOR COMBINER AND SEPARATOR AND IMPLEMENTATIONS to Kent J. Vincent and Hans D. Neuman; U.S. Pat. No. 5,038,028 for OPTICAL SCANNER APERTURE AND LIGHT SOURCE ASSEMBLY to Boyd, et al.; and U.S. Pat. No. 5,227,620 for APPARATUS FOR ASSEMBLING COMPONENTS OF COLOR OPTICAL SCANNERS to Elder, et al., which are assigned to the common assignee of the present invention and incorporated herein by reference for all that is disclosed therein.

While flatbed scanners are well known and are being used, they tend to have a rather large "footprint." As a result, flatbed scanners occupy a substantial amount of space wherever they are placed (e.g., a desktop or a tabletop). An exemplary prior art desktop arrangement is illustrated in FIG. 1. As illustrated, a significant portion of the surface area of a desktop 10 may be consumed by a number of items associated in a common computing configuration. For example, the desktop 10 may be outfitted with a personal computer 12, a monitor 14, a printer 15, left and right channel stereo speakers 13a, 13b, a keyboard 16, and a mouse 18. A flatbed scanner 17, mouse pad 19, telephone 20, and an external modem device 30 may further clutter the desktop 10. It is easy to see that the flatbed scanner 17 consumes a significant portion of the area on the desktop 10. With the exception of today's popular large cathode ray tube (CRT) display monitors and some large printers (e.g., the printer 15), the flatbed scanner 17 consumes the greatest area on the surface of the desktop 10.

Computer and computer peripheral device manufacturers have used several approaches to address the problem of a crowded desktop 10. These approaches have included various stacking schemes, such as stacking the monitor 14 or printer 15 on top of the computer 12, combining the keyboard 16 with the mouse 18 to form an integral input unit, or making the computer 12 and other peripherals narrower and taller, such as in the form of a computer tower 12, or a flat monitor 14. One such stacking arrangement is disclosed in U.S. Pat. No. 5,822,080 to Chavez, assigned to the common assignee of the present invention and incorporated herein by reference, which discloses combining the lid of a flatbed scanner with a keyboard and a mouse. Scanner manufacturers have responded to the problem of a crowded desktop 10 by decreasing the size of the scanner 17. For example, sheet feeding scanners and handheld scanners have been introduced. However, these scanning devices do not offer the flexibility of a flatbed scanner. Both sheet feed scanners and hand-held scanners are not capable of scanning bound documents, books, or three-dimensional objects. In addition, sheet feed and hand-held scanners do not provide preview scanning. Flatbed scanners are capable of performing these and other tasks. This leaves scanner users with the choice of trading desktop space for scanner functionality and flexibility. Thus, it would be desirable to have a flatbed scanner with the flexibility and functionality of current flatbed scanners while simultaneously reducing desktop space requirements.

SUMMARY OF THE INVENTION

In response to these and other shortcomings of the prior art, a space-saving scanner assembly is disclosed. Briefly described, the space-saving scanner assembly can be constructed with a housing having a substantially vertical source-contact surface with a channel extending therefrom and a flap. The flap is coupled to the source-contact surface and has a source-backing surface substantially parallel to the source-contact surface of the housing and arranged such that the source-contact surface, the source-backing surface, and the channel form an opening for receiving an edge of a source document to be scanned.

A method for operating a space-saving scanner is also presented. The method can be broadly summarized by the following steps: providing a scanner with a housing with a substantially vertical source-contact surface and a channel extending therefrom, the vertical source-contact surface including a transparent platen portion, the channel adjacent to a lower edge of the transparent platen; and providing a flap coupled to the source-contact surface, the flap having a source-backing surface substantially parallel to the source-contact surface of the housing, wherein the source-contact surface, the source-backing surface, and the channel form an opening for receiving an edge of a source document to be scanned.

BRIEF DESCRIPTION OF THE DRAWINGS

The invention can be better understood with reference to the following drawings. The components in the drawings are not necessarily to scale, emphasis instead being placed upon clearly illustrating the principles of the space-saving scanner assembly. Moreover, in the drawings, like reference numerals designate corresponding parts throughout the several views.

DETAILED DESCRIPTION OF PREFERRED EMBODIMENTS

Figure 1:
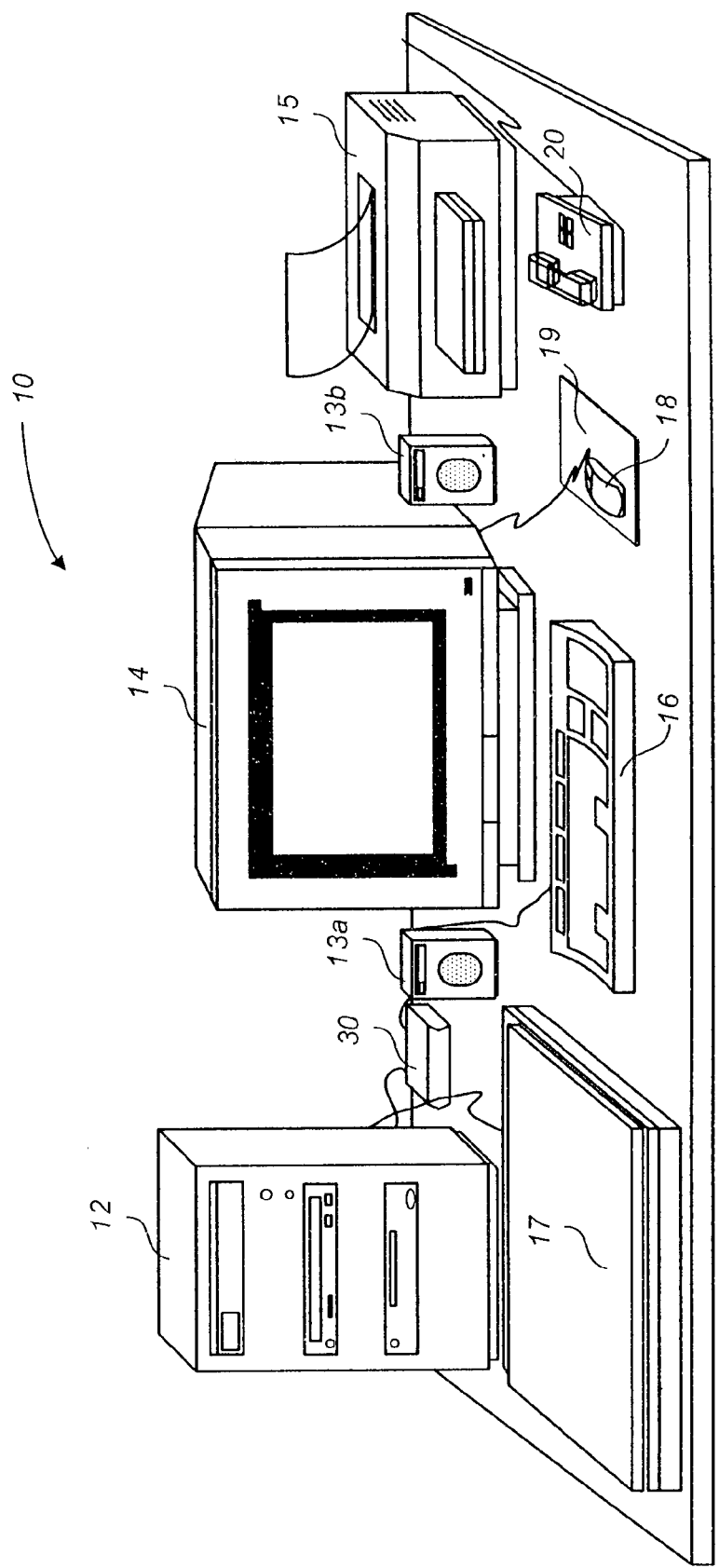
FIG. 1 is a schematic illustrating a prior art approach to arranging multiple items associated with a personal computer on a desktop.

Having summarized various aspects of the space-saving scanner assembly, the space-saving scanner assembly will now be described in detail with reference to the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims. Turning now to the drawings, wherein like reference numerals designate corresponding parts throughout the drawings, reference is made to FIG. 2, which illustrates a schematic of an exemplary operational environment suited for a space-saving scanner assembly 100. In this regard, an exemplary operational environment may comprise a variation of the desktop 10 introduced with regard to FIG. 1.

Figure 2:
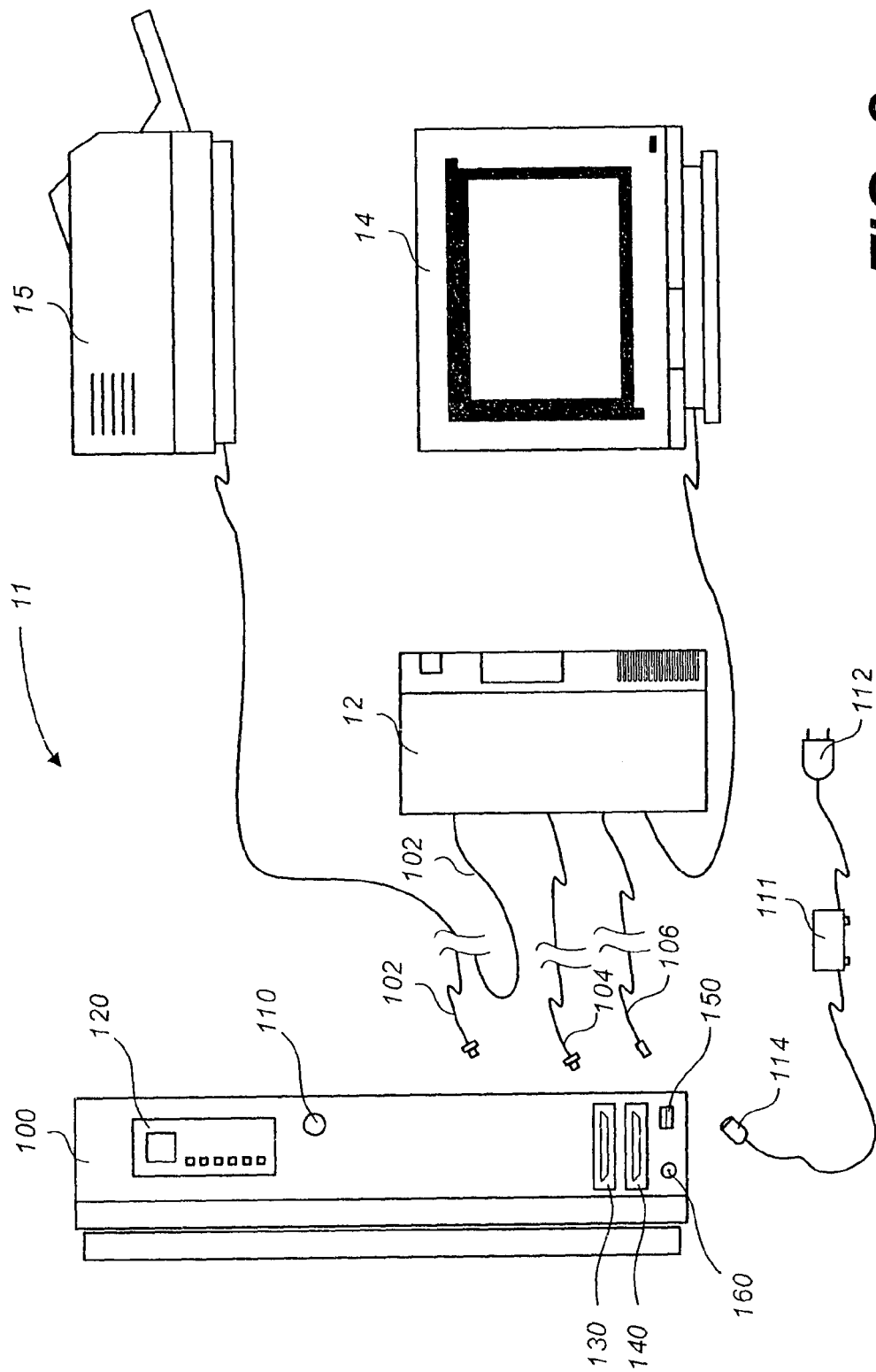
FIG. 2 is a schematic diagram illustrating an embodiment of a space-saving scanner assembly.

As illustrated in FIG. 2, a modified desktop 11 may comprise a personal computer 12, a monitor 14, a printer 15, and a space-saving scanner assembly 100. As illustrated in the schematic diagram of FIG. 2, the space-saving scanner assembly 100 may be configured with an on/off switch 110, a control interface 120, as well as, various connectors for permitting input and output signals to be sent and received by the various devices on a front panel. In a preferred embodiment, the space-saving scanner assembly 100 is configured with a parallel input port connector 130, a parallel output port connector 140, a universal serial bus (USB) port 150, as well as, a direct current (DC) power receptacle 160. It will be appreciated by those skilled in the art that the parallel input and output port connectors 130, 140 and the USB port 150 may be configured with suitable interfaces for transferring operational commands to the space-saving scanner assembly 100 and scanned image data from the space-saving scanner assembly 100. These and other suitable interfaces for transferring commands and data are well known and understood in the art and need not be disclosed herein to appreciate the space-saving scanner assembly 100.

As shown in FIG. 2, DC power may be supplied to the space-saving scanner assembly 100, via a power supply assembly comprising a transformer 111, an AC power plug 112, and a DC power jack 114. As is known, the power supply assembly may be configured to convert alternating current (AC) power from a wall receptacle to an appropriate DC voltage for providing the necessary power required to drive the various electrical components of the space-saving scanner assembly 100.

As illustrated in FIG. 2, the space-saving scanner assembly 100 supports a variety of command and data interface configurations. For example, the space-saving scanner assembly 100 may support a USB interface via the USB port 150, a USB cable 106, and a USB port in communication with the personal computer 12 (not shown). It will be appreciated that the USB port associated with the computer 12 may be used to connect numerous peripheral devices (e.g., the space-saving scanner assembly 100, as well as, a host of other peripheral devices such as mice, modems, and keyboards). Importantly, the USB port supports Plug-and-Play installation and hot or powered plugging.

In addition, the space-saving scanner assembly 100 may be configured to support a parallel communications interface via the parallel input connector 130, a parallel communications cable 104. Furthermore, the space-saving scanner assembly 100 may be configured to interface with the printer 15 via the parallel output connector 140 and a printer interface cable 102. As is known, the combination of the parallel communications cable 104, the parallel input and output connectors 130, 140 respectively, and the printer interface cable 102 may form an external parallel communications bus, capable of transmitting printer commands from the personal computer 12 through the aforementioned devices on to either the space-saving scanner assembly 100 or the printer 15 as desired.

It will be appreciated that the parallel port interface associated with the personal computer 12 preferably uses a 25-pin connector for connecting printers, computers, and other devices such as the space-saving scanner assembly 100 that require a relatively high bandwidth. A newer type of parallel port may also be supported by the space-saving scanner assembly 100. Both an enhanced parallel port (EPP) or an extended Capabilities Port (ECP) may be supported over the same parallel input and output connectors 130, 140. Both of these next generation parallel ports support bi-directional communication and high data transfer rates. It will be further appreciated that the space-saving scanner assembly 100 may be configured with a small computer system interface (SCSI) for transferring data and commands to the printer 15 and the personal computer 12. Regardless of the data transfer format(s) selected to operate the space-saving scanner assembly 100, the parallel input and output connectors 130, 140 may be implemented with commercially available connectors such as a D-Sub connector, a Half-Pitch SCSI connector, a Full-Pitch SCSI connector, and other like connectors. The communications port, the connector type, and the number of conductors represent design choices that add to the flexibility of the space-saving scanner assembly 100.

Figure 3:
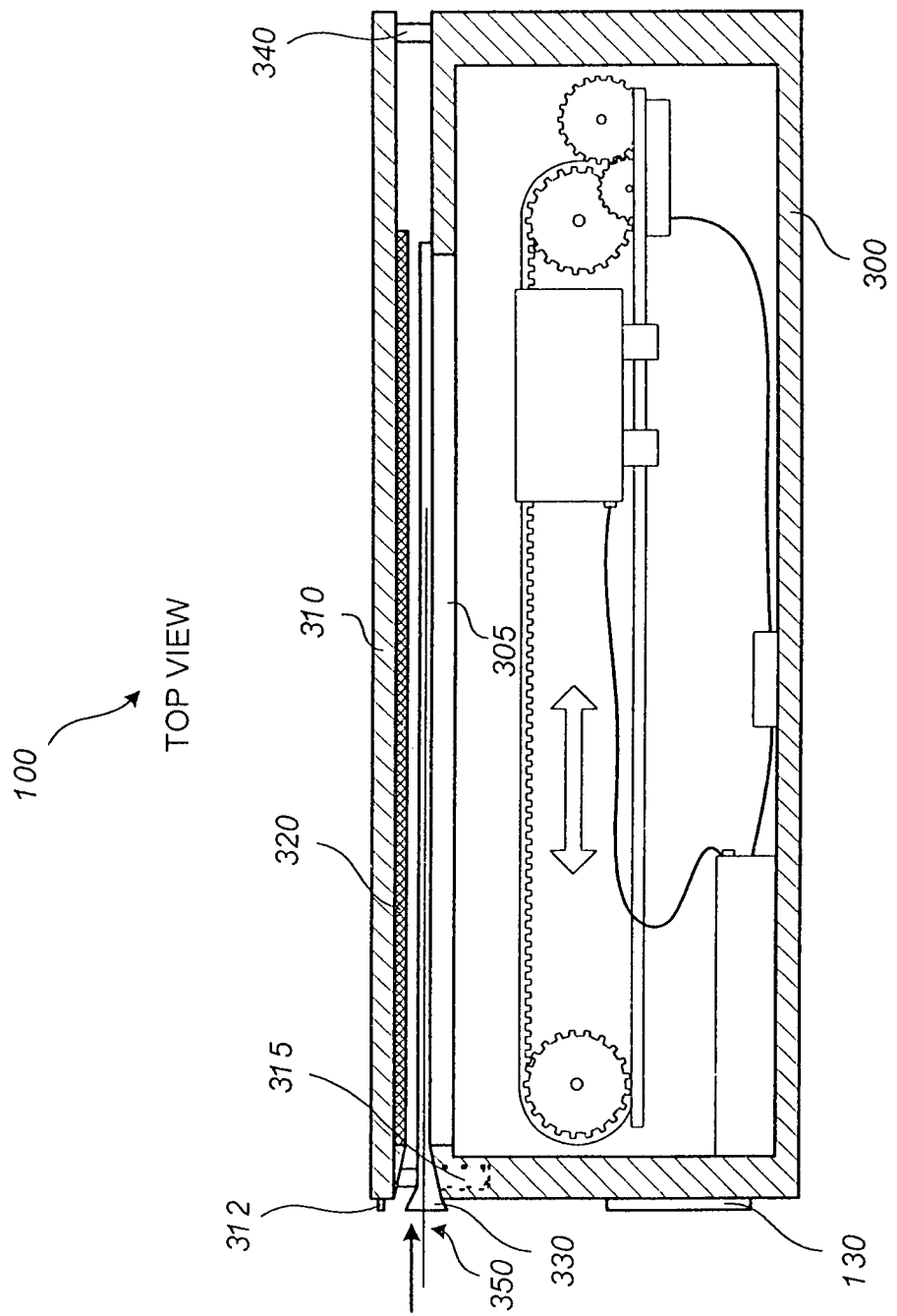
FIG. 3 is a cross-sectional top view of an exemplary embodiment of the space-saving scanner assembly of FIG. 2.

The inputs and outputs of the space-saving scanner assembly 100 having been generally introduced and described in FIG. 2, reference is now directed to FIG. 3, which, presents a cross-sectional top view of an exemplary embodiment of the space-saving scanner assembly of FIG. 2. As illustrated in FIG. 3, the space-saving scanner assembly 100 may include a housing 300 and a flap 310. The housing 300 maybe configured to contain an optical scanning means moveable along a guide rod, a transmission means for driving the optical scanning means, a transmission controller means, a first cable for signal transmissions and power distribution between the optical scanning means and the personal computer 12 (see FIG. 2), a second cable for control and power signal distribution between the transmissions means, and the transmission controller means. The housing 300 may also be associated with a transparent scanning plate or platen 305, a source-support channel 330, one or more threaded recesses 315, and a plurality of flap support posts 340.

The optical scanning means may be a charge-coupled device (CCD) scanning means known in the art (including a light source, a controller, and a CCD member, not shown in the figure), or a complementary metal oxide semiconductor (CMOS) scanning means, or a CIS scanning means (including a light source, a controller, and a CIS contact type scanning member, not shown in the figure). The transmission means may be a motor in cooperation with one or more rollers or gears. As is known, the transmission means may be driven by a controller, which may be in communication with a scanning means controller, with both controllers in further communication with the personal computer 12. The motor may be a servo-motor, a DC motor, or a step motor, etc. The rollers may be a set of pulleys and or gears configured to receive a belt or a cog belt. The transmission means may also be constructed using one or more gears with a threaded rod as is known in the art.

The optical scanning means controller and the transmission means controller may together form a composite controller. The composite controller may be implemented in hardware with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. The composite controller may transmit and receive data from the personal computer 12 and the printer 15.

The transparent scanning plate or platen 305, may take the form of a sheet of glass or other transparent material preferably resistant to scratches that may be caused by repetitively sliding source materials across a contact surface of the platen 305. For example, the platen 305 may be constructed of, but not limited to, plastic that will permit visible light to pass from the illumination source through the platen 305 to the source to be scanned 350 (e.g., a photograph, a business card, a document, or other printed material). The platen material also permits the visible light to pass (i.e., reflect) from the surface of the source 350 to be scanned through to the photosensitive detector associated with the scanning means. In order to maximize the range of sizes of source materials that may be scanned with the space-saving scanner assembly 100, a substantial portion of a source-contact surface formed by the exterior of the housing 300 will take the form of the platen 305.

As is also shown in the cross-sectional top view of FIG. 3, the housing 300 of the space-saving scanner assembly 100 may be configured with a source-support channel 330. The source-support channel 330 may be arranged such that an edge of the source 350 to be scanned is closely arranged to coincide with the lower edge of the platen 305. It should be appreciated that this arrangement of the source-support channel 330 allows a substantial portion of the source 350 to be correctly positioned over the source-contact surface formed by the combination of the platen 305 and the exterior surface of the housing 300 such as to permit optical scanning. The source-support channel 330 may be configured from a material having a relatively low coefficient of friction to permit an edge of a source document, photograph, and other like materials to be scanned, to easily enter and exit the opening formed by the source-contact surface of the housing 300, the source-backing surface of the flap 310 (e.g., the pad 320) and the source-support channel 330.

As is further illustrated in FIG. 3, a portion of the source-support channel 330 may be configured to extend beyond both the housing 300 and the flap 310 of the space-saving scanner assembly 100 to form the lower surface of an opening suitable for receiving the source 350. It should be appreciated that the platen 305 and a pad 320 associated with the flap 310 will form the sides of the opening for receiving the source 350. It is significant to note that that portion of the source-support channel 330 that extends beyond the housing 300 and the flap 310 may be tapered such that the width of the source-support channel 330 decreases. This arrangement of the source-support channel 330 permits easy access to the substantially uniform portion of the support channel 330 that coincides with the platen 305.

The flap 310 may be associated with the housing 300 via a plurality of assemblies. As illustrated in FIG. 3, the flap 310 may be associated with the housing 300 via a pin 340. The pin 340 may be fixed to the platen side of the flap 310 and may be received within a recess (not shown) having one or more detent positions for keeping the internal or platen side of the flap 310 closely arranged with the source-contact surface of the housing 300 such that the source 350 is in contact with the platen 305. It will be appreciated that the pad 320 associated with the flap 310 may be constructed of foam or other compressible material capable of holding the source 350 in contact with the platen 305. The pad 320 may comprise a substantial portion of a source-backing surface that serves to protect both the platen 305 and the source 350 from adjacent surfaces of the flap 310. In a preferred embodiment the flap 310 and the housing 300 are associated with at least two pins 340 and recesses with multiple detent positions.

As is further illustrated in the top view of FIG. 3, the flap 310 may be associated with the housing 300 using one or more adjusters 312. The adjusters 312 may comprise a thumb wheel fixed to a threaded shaft configured to match a threaded recess 315 provided in the housing 300. The combination of the adjusters 312 and the threaded recesses 315 permit an operator of the space-saving scanner assembly 100 to selectively adjust the compressive force applied from the pad 320 to the non-scan side of the source 350. This selective adjustment in combination with the aforementioned and described pins 340 and associated housing recesses permit an operator of the space-saving scanner assembly 100 to achieve the desired results from the optical scanning means contained within the housing 300.

While a combination of two adjusters 312 and two pins 340 is contemplated in a preferred embodiment, other arrangements of physical assemblies that permit an operator to selectively adjust the contact pressure applied to the source 350 when it is positioned over the platen 305 are contemplated and are considered within the scope of the space-saving scanner assembly 100. For example, a single pin 340 and its associated recess may be positioned near the center of the rear edge of the flap 310 and the housing 300. Alternatively, three or more pins 340 and their respective recesses may be spatially arranged along the rear edge of the flap 310 and the housing 300. These and other arrangements may be devised as addressed in the appended claims.

Figure 4:
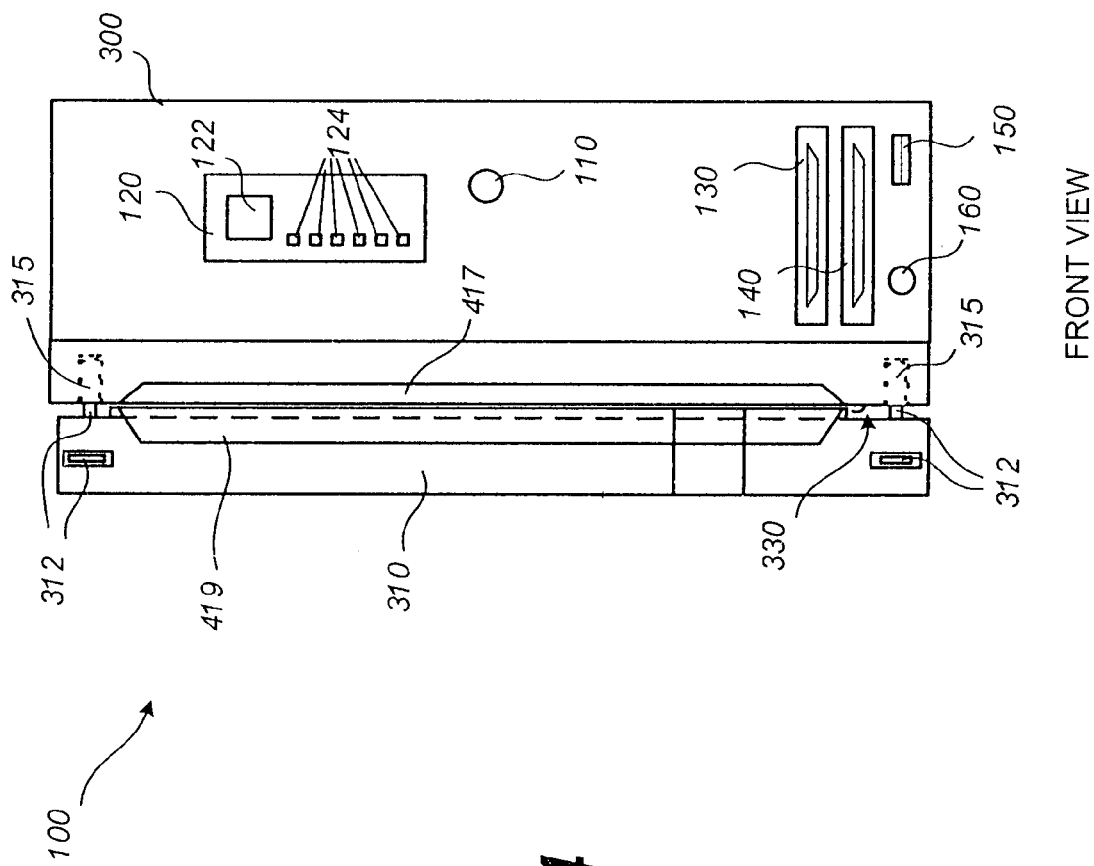
FIG. 4 is a schematic diagram illustrating the embodiment of the space-saving scanner assembly of FIG. 3 in a front view.

The various structures and assemblies of the space-saving scanner assembly 100 having been generally described with regard to FIG. 3, reference is now directed to FIG. 4, which presents a front view of the exemplary embodiment of the space-saving scanner assembly of FIG. 3. As illustrated in FIG. 4, the space-saving scanner assembly 100 may include a number of features generally associated with the front panel of the housing 300 and the flap 310 that may not be appreciated from the top view of FIG. 3. More specifically, the housing 300 may include the control interface 120 (see FIG. 2) and an inclined surface 417, whereas the flap 310 may include its own inclined surface 419.

As shown in the front view of FIG. 4, the interface panel 120 may have a display 122 and several function selection switches 124. The display 122 may be used to indicate a present operational status of the space-saving scanner assembly 100. For example, the display 122 may provide information indicating whether DC power is available, an operating mode, the general health of components, and similar information. It should be appreciated that the display 122 may comprise an array of lamps, light emitting diodes (LEDs), liquid crystals, and other similar devices.

The function selection switches 124 may be used to permit an operator of the space-saving scanner assembly 100 to enter various information directly at the device in lieu of having to place a source 350 in the space-saving scanner assembly 100 and having to enter information at a peripheral device in communication with the personal computer 12 which may be inconveniently situated with regard to the space-saving scanner assembly 100. It should be appreciated that the plurality of function selection switches 124 may be used to select one or more printed document modes, such as but not limited to, "scan," "copy," "fax," "email," "optical character recognition (OCR)" etc. In addition, various function selection switches 124 may be provided to permit an operator to select a quantity of scanned source copies, or to vary one or more operator selectable parameters related to scanning image sources such as but not limited to photographs, maps, and the like. These may include function selection switches 124 configured to select a scan area, to scan for color content, to enhance the brightness of the illumination means, to apply various filters, to select a scan resolution, etc.

As also illustrated in the front view of FIG. 4, the inclined surfaces 417, 419 are arranged to permit the placing of the source 350 (e.g., a single sheet of paper to be scanned) into the opening defined by the flap 310 and the housing 300 such that the source 350 is arranged to coincide with the platen 305 (FIG. 3). In order to prevent possible hang-ups or obstruction of the source 350 during an extraction from the space-saving scanner assembly 100, it is contemplated that the adjacent edge formed at the intersection of the housing 300 and the platen 305 be substantially at the same level to provide a smooth, and snag-free source opening. In this regard, the inclined surface 417 may extend into the source opening up to the front edge of the platen 305. In order to prevent similar hang-ups with regard to the flap 310, the inclined surface 419 may extend up to the front edge of the pad 320.

Figure 5:
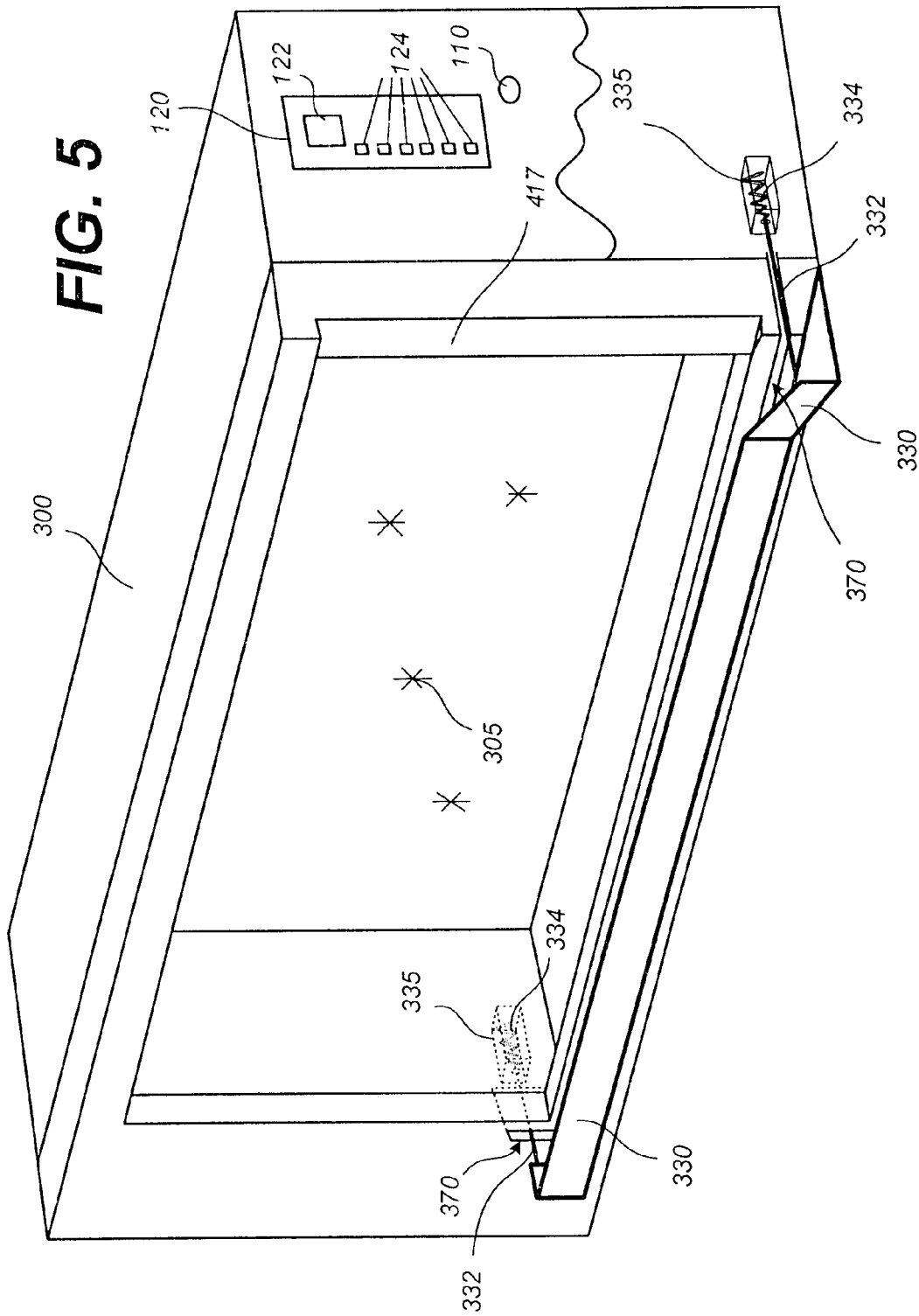
FIG. 5 is a perspective schematic of the housing (with the flap removed) of the space-saving scanner assembly of FIG. 2 highlighting an embodiment of a source-supporting channel.

Reference is now directed to FIG. 5, which presents a perspective schematic of the housing 300 (with the flap 310 removed) of the space-saving scanner assembly 100. As shown in FIG. 5, the housing 300 may be configured with a recess 370 for receiving the source-supporting channel 330. The housing 300 may also include a plurality of recesses 335 each outfitted with a coil spring 334 that may be fixed via a pin 332 at corresponding positions along the source-supporting channel 330. It will be appreciated that coil springs 334 may be selected and having substantially equal spring constants sufficient to overcome forces from the flap 310 or within the housing recess 370 (i.e., friction) that may tend to retain the source-supporting channel 330 within the housing recess 370 even after pressure from the flap 310 has been removed by an operator of the space-saving scanner assembly 100. It should be further appreciated that the coil springs 334 may or may not be fixed within the recesses 335 within the housing 300. For those applications where the coil springs 334 are simply set in their respective recesses 335, the housing 300 may be configured with one or more stops arranged to prevent the source-supporting channel 330 from being completely removed from the housing 300.

Figure 6:
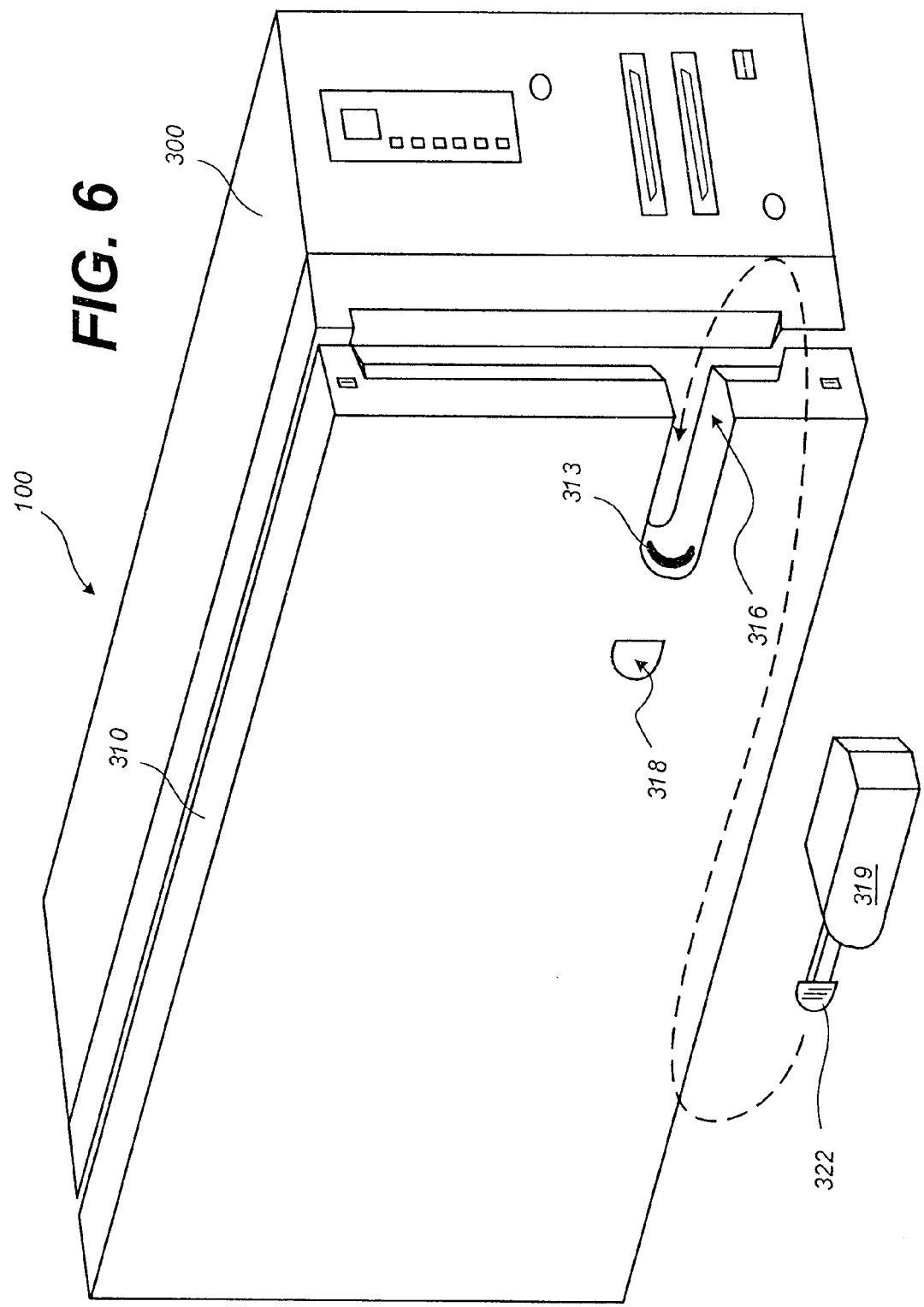
FIG. 6 is a perspective schematic of an embodiment of the space-saving scanner assembly of FIG. 2 highlighting the various elements associated with a flap.

The various structures and assemblies of the space-saving scanner assembly 100 having been generally described with regard to FIG. 5, reference is now directed to FIG. 6, which presents a perspective schematic of an embodiment of the space-saving scanner assembly 100 with the flap 310. In this regard, the flap 310 may be configured with an opening 316 and a notch 318.

The opening 316 may be configured to permit an operator to adjust a source document, photograph, business card, or the like that has been placed in the source-supporting channel 330 and between the flap 310 and the housing 300 so that an item to be scanned is placed in contact with the platen 305. An operator may make this adjustment by contacting the source to be scanned or removed with one or more digits of one or more fingers. Alternatively, the operator may adjust a source document by inserting a tool or other foreign instrument into the opening 316 as required to position and remove source items from the space-saving scanner assembly 100. For example, an operator can use the eraser end of a common pencil to contact a source item through the opening 316.

As illustrated in FIG. 6, it may be necessary to insert a plug 319 into the opening 316 in order for the flap 310 to remain in close contact with the source 350 (see FIG. 3) and the platen 305. As shown in FIG. 6, the plug 319 may be configured such that it has an inclined surface that will coincide with the inclined surface 419 when the plug 319 is set within the opening 316. As further illustrated in FIG. 6, the plug 319 may be configured with a latch 322 configured to extend and closely contact a notch 318 in the flap 310.

While the opening 316 extends through the flap 310, the notch 318 and a related slot 313 are configured within the flap 310 such that the pad 320 remains continuous under the notch 318 and the slot 313. It will be appreciated that the surface of the plug 319 arranged to contact the back or non-scan side of the source 350 may be configured with its own pad similar to the pad 320. This arrangement provides the operator with the flexibility to use the space-saving scanner assembly 100 as a flatbed scanner in a flap up configuration, as well as, in a space-saving arrangement with the flap 310 and the housing 300 arranged in a side-by-side configuration suitable for a bookshelf or other limited space arrangements.

Figure 7:
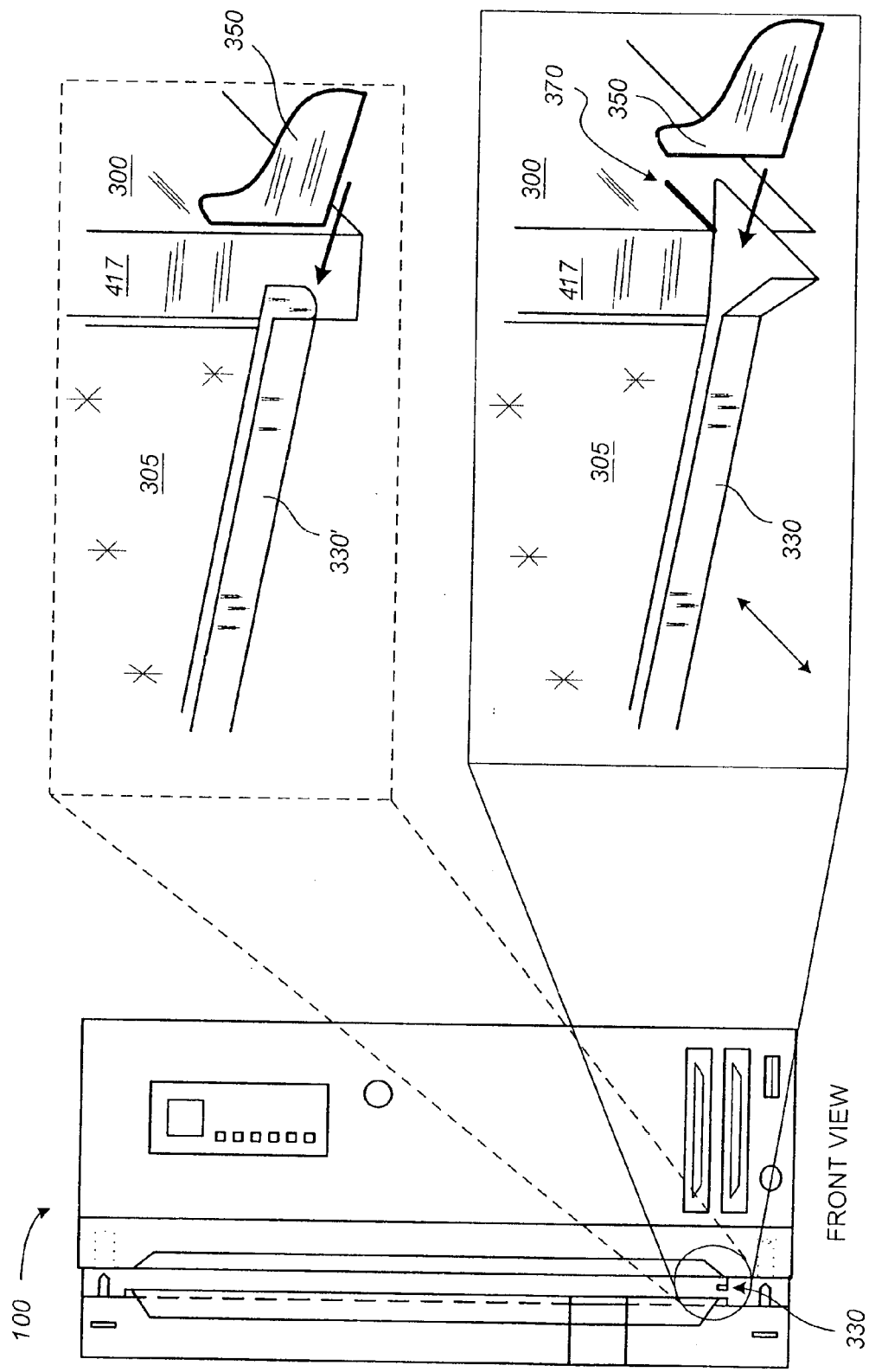
FIG. 7 is a schematic diagram highlighting alternative embodiments of the source-supporting channel of FIG. 5.

The flap 310 of the space-saving scanner assembly 100 having been generally described with regard to FIG. 6, reference is now directed to FIG. 7, which presents a schematic diagram highlighting alternative embodiments of the source-supporting channel 330 introduced the illustration of the housing 300 in FIG. 5. Two exemplary embodiments are shown. In a first embodiment, shown in the lower right portion of FIG. 7, the source-supporting channel 330 is illustrated in a partial perspective view. This embodiment reflects the source-supporting channel 330 previously introduced and described with regard to FIGS. 3 and 5. As previously described, the source-supporting channel 330 may extend past the front panel of the housing 300 and may be tapered such that a first end or source-receiving end closest to the front panel 300 may easily receive the lower edge of a source 350 to be scanned by the space-saving scanner assembly 100. As also previously described with regard to FIG. 5, the housing 300 may be configured with a recess 370 shaped to receive a significant portion of the source-supporting channel 330.

In preferred embodiments, the source-supporting channel 330 is configured with a lip (not shown) disposed at an opposing end of the source-supporting channel (not shown). It will be appreciated that the lip may be arranged such that an insignificant portion (i.e., a border) of the source 350 extends past the far edge of the platen 305 (see FIG. 3). In alternative implementations, the housing 300 may be configured with a plate (not shown) arranged to stop the source 350 from extending past the far edge of the platen 305. It will be appreciated that if a stop is added to the housing 300 that it may be necessary to provide a suitably arranged recess in the flap 310 to receive the plate when the flap 310 is adjusted to closely contact the platen 305 and the housing 300.

In a second embodiment, shown in the upper right portion of FIG. 7, the source-supporting channel 330' is illustrated in a second partial perspective view. This alternative embodiment shows that the source-supporting channel 330' may take the form of a U-shaped channel. As in the first embodiment, the source-supporting channel 330' extends past the leading edge of the platen 305 into an opening formed by the housing 300 and the flap 310 (not shown). It will be appreciated that other various structures may be used to implement the source-supporting channel 330'. For example, the source-supporting channel 330 may be implemented with a J-shaped trough (as viewed from the rear of the space-saving scanner assembly 100).

Regardless of the particular structural embodiment selected to implement the source-supporting channel 330, it is desirable to construct the source-supporting channel 330 with a material having a low coefficient of friction. It will be appreciated that a number of materials having a low coefficient of friction may be applied to the inner surfaces of the source-supporting channel 330. The low coefficient of friction on the inner surface of the source-supporting channel 330 will further ease operator placement and retrieval of source materials into and out from the space-saving scanner assembly 100.

Figure 8:
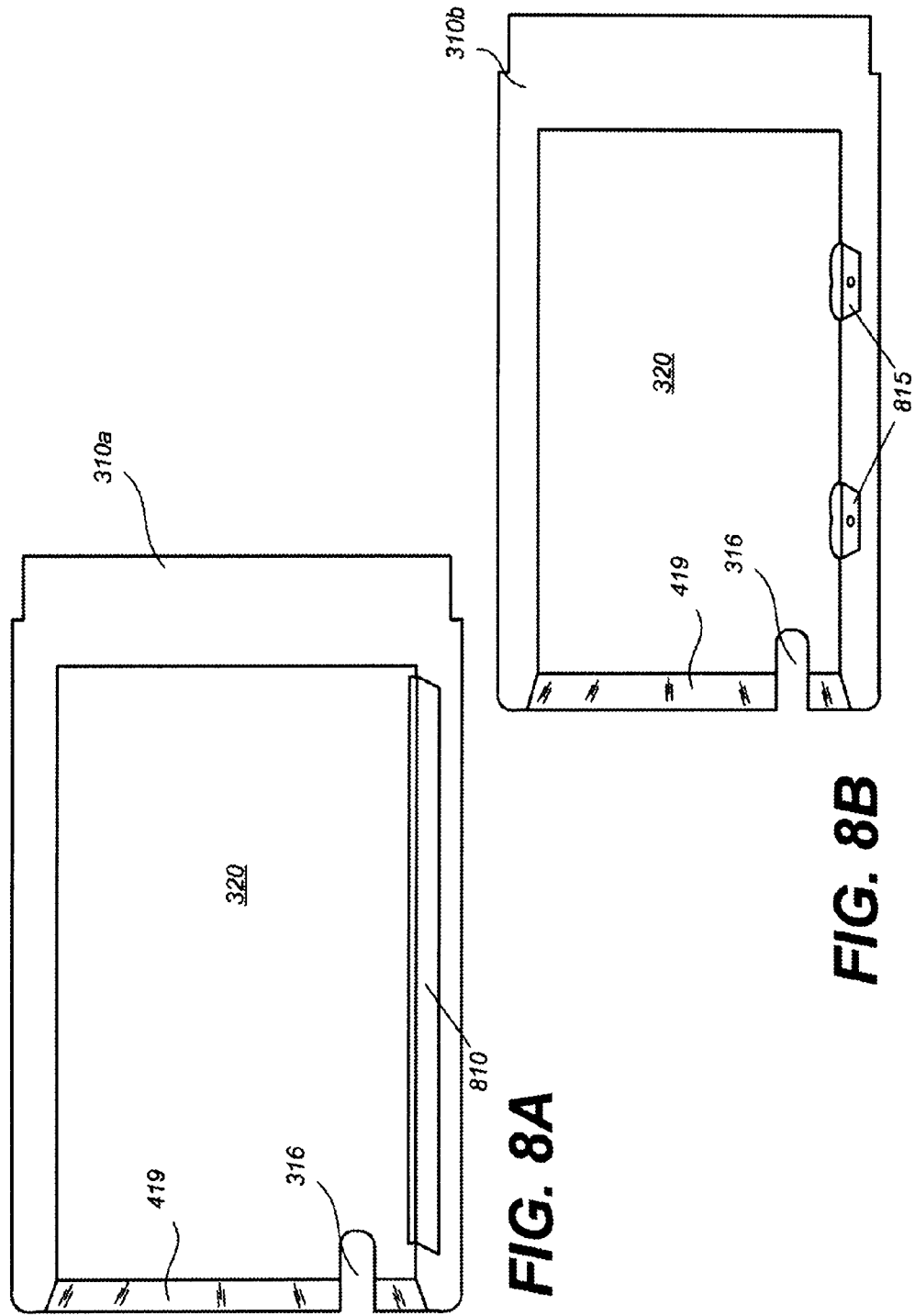
FIGS. 8A and 8B are schematic diagrams of the underside of the space saving scanner assembly flap of FIG. 6.

Reference is now directed to FIGS. 8A and 8B, which illustrates alternative configurations of the platen 305 side (i.e., the internal surface) of the flap 310. In a first alternative configuration illustrated in association with flap 310a, the underside of the flap 310a is configured with a spring-clip 810. As illustrated, the spring-clip 810 may be applied such that it extends over a significant portion of lower edge of the pad 320. The spring-clip 810 may be constructed of a material that provides enough resilient force to closely hold the source 350 to be scanned against the underside of the pad 320.

In a second alternative, illustrated in association with flap 310b, the underside of the flap 310b is configured with a plurality of clips 815. As shown, the plurality of clips 815 may be spatially arranged along the lower edge of the pad 320 so as to closely contact a range of various sized sources 350 to be scanned against the underside of the pad 320.

Figure 9:
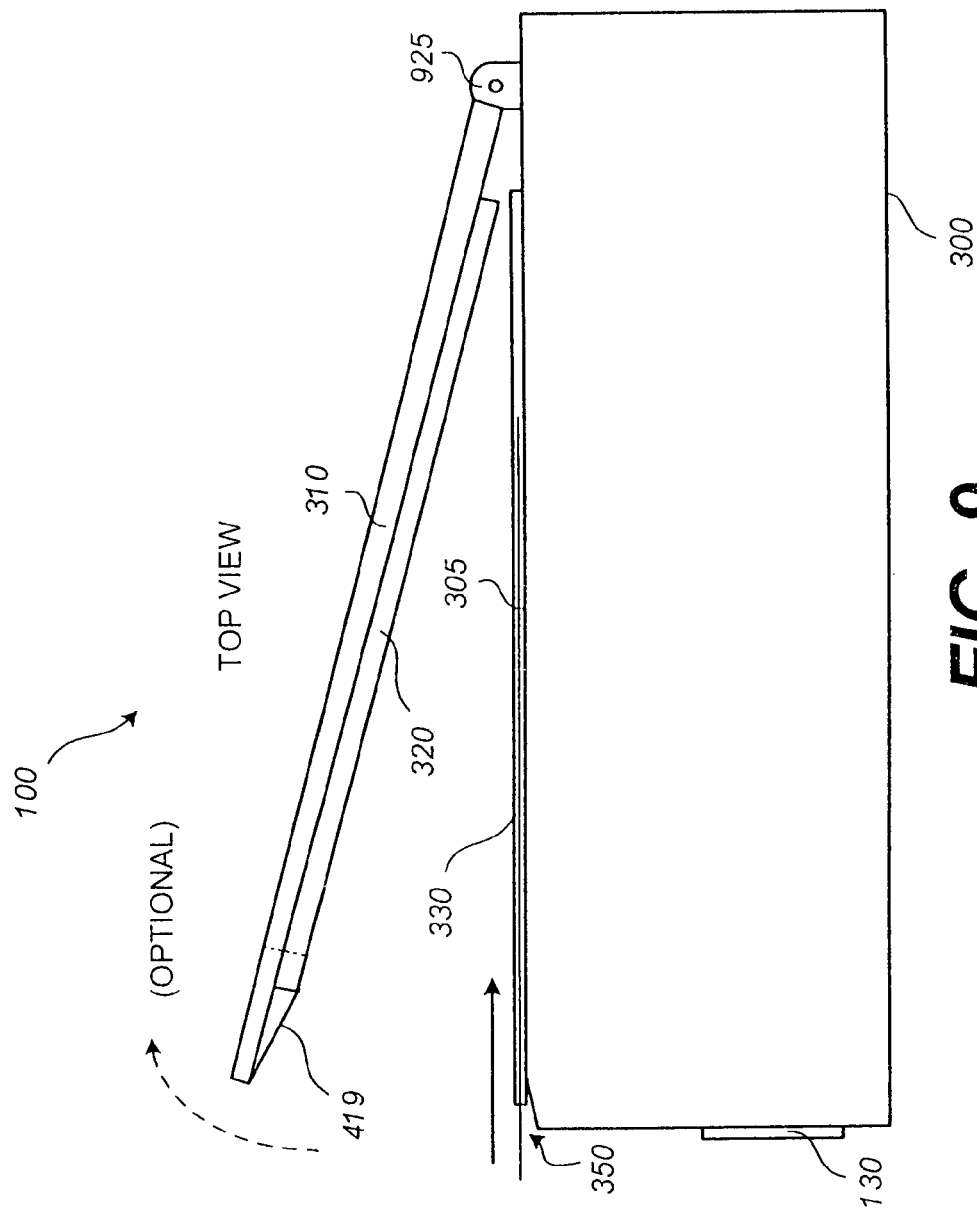
FIG. 9 is a cross-sectional top view of an exemplary embodiment of the space-saving scanner assembly of FIG. 2 having a hinged flap.

Alternative flap configurations having been introduced and described with regard to FIGS. 8A and 8B, reference is now directed to FIG. 9, which presents a top view of an exemplary embodiment of the space saving scanner assembly 100 having a hinged flap assembly. As illustrated in FIG. 9, the space saving scanner assembly 100 may be configured with an optional flap attachment means. As shown in the top view of FIG. 9, the optional flap attachment means may take the form of a hinge associated with the flap 310 and a plurality of posts configured to receive the hinge spatially arranged on the housing 300.

Figure 10:
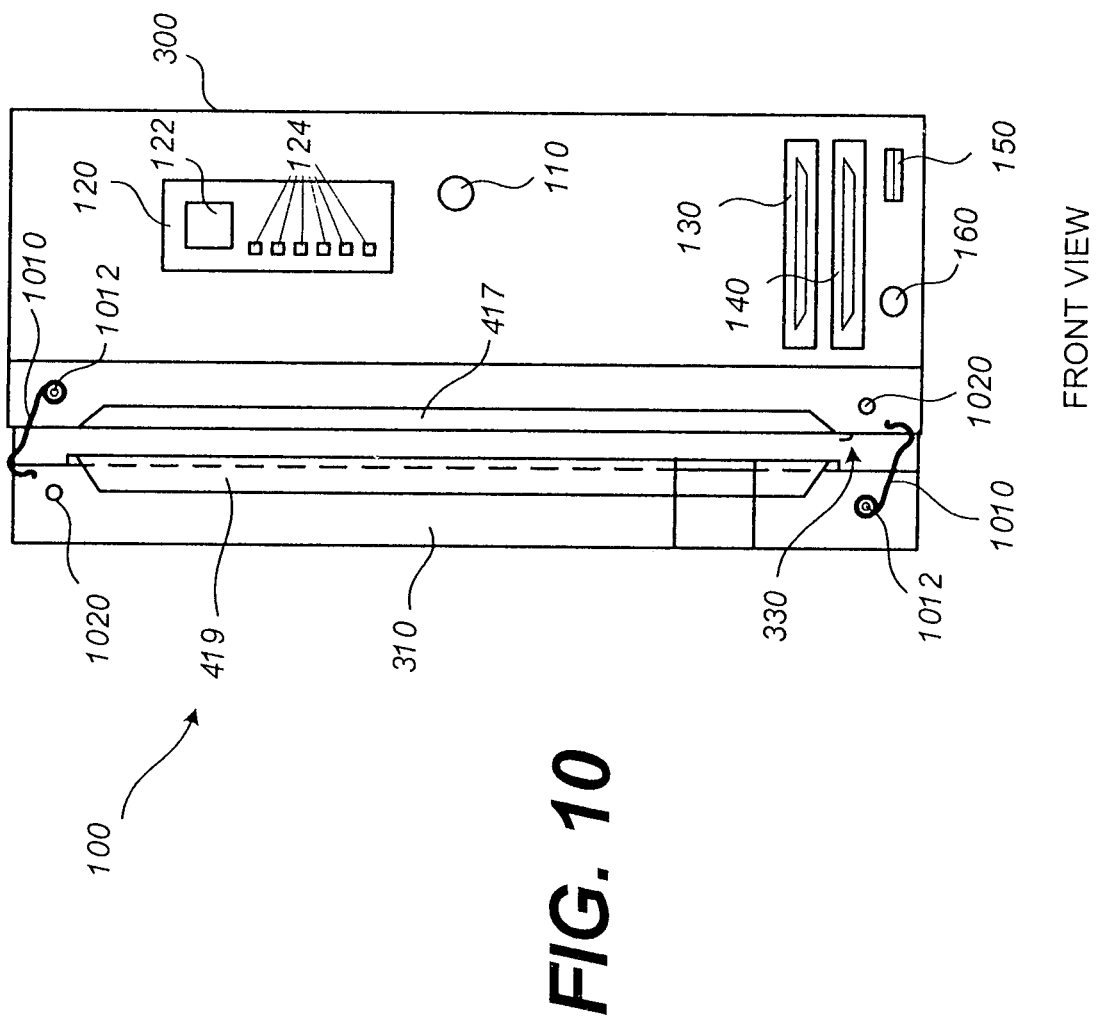
FIG. 10 is a schematic diagram of the space-saving scanner assembly of FIG. 2, highlighting an alternative for closely arranging the underside of the flap with the platen.

As shown in FIG. 10, the flap 310 may be substantially configured as previously described with a pad 320 fixedly attached to the side of the flap 310 that comes into contact with the platen 305. The flap 310 may have an inclined surface 419 to more easily permit an operator to introduce source 350 into an opening formed by the flap 310, the housing 300, and the source-supporting channel 330. This optional flap attachment arrangement permits an operator to introduce source 350 items that have a thickness greater than that, which can be supported by the source-supporting channel 330. For example, this arrangement may permit an operator to scan portions of a bound book or other bulky items.

Reference is now directed to FIG. 10, which highlights an alternative embodiment suited for closely arranging the internal side of the flap 310 with the platen 305. As illustrated in FIG. 10, the space-saving scanner assembly 100 may include a number of features generally associated with the front panel of the housing 300 and the flap 310 for closely arranging the flap 310 with the housing 300 when a source 350 has been positioned over the platen 305 in preparation for scanning the source 350. More specifically, the housing 300 may include one or more posts 1012 (one shown with the housing 300) associated with a clasping member 1010.

As shown in FIG. 10, the clasping member 1010 is configured such that it closely contacts an associated pin 1020 (one shown with the housing 300, a second shown associated with the flap 310). A spatial arrangement of posts 1012, the clasping members 1010, and the pins 1020 may be predetermined such that when the clasping members 1010 are positioned to closely contact the pins 1020, the pad 320 on the internal surface of the flap 310 comes in close contact with the platen 305. It should be appreciated that a number of known assemblies will suffice and are readily commercially available that may also serve to close the source opening between the flap 310 and the housing 300. For example, these assemblies may include an elastic fabric provided with hooks that may be brought in close contact with a corresponding fabric having a plurality of small loops. These assemblies may also include various snap fasteners associated with an elastic fabric and or a variety of adjustable force latches. These and other assemblies for adjustably closing the opening between the flap 310 and the housing 300 are deemed within the scope of the space-saving scanner assembly 100.

It should be emphasized that the above-described embodiments of the space-saving scanner assembly 100, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the space-saving scanner assembly 100 as protected and set forth by the following claims.

Having thus described the invention, what is claimed is the following:

1. A space-saving scanner assembly, comprising:
    a housing having a substantially vertical source-contact surface with a member forming a channel that protrudes from the housing, said member having a first side that is substantially parallel to, and opposed from, said source-contact surface, said member having a second side substantially orthogonal to the first side, wherein the member extends to an exterior surface of said housing; and a flap coupled to the source-contact surface the flap having a source-backing surface substantially parallel to the source-contact surface of the housing, wherein the source-contact surface, the source-backing surface, and the first and second sides of the member form an aperture for receiving an edge of a source to be scanned, wherein the flap comprises a slot.

2. The assembly of claim 1, wherein the slot is positioned to permit the placement of a relatively short source document on edge on the member such that information to be scanned is aligned with at least a portion of a platen.

3. A space-saving scanner assembly, comprising:
means for housing an optical scanning means; and
means for forming an aperture configured to closely receive a leading edge of a source, such that the source can be spatially arranged with the optical scanning means without adjusting the aperture, the source being supported along a horizontal edge different from the leading edge of said source along a channel means in the aperture, wherein the means for forming an aperture comprises a flap having a slot.

4. A method for saving space on a desktop, comprising:
providing an optical scanner having a housing, the housing having a substantially vertical source-contact surface with a member forming a channel protruding from the housing; and
coupling a flap to the source-contact surface, the flap having a slot extending to an edge of the flap and source-backing surface substantially parallel to the source-contact surface of the housing, wherein the source-contact surface, the source-backing surface, and the member form an aperture for horizontally receiving a source to be scanned.

5. The method of claim 4, further comprising inserting a leading edge of a source to be scanned into the aperture formed by the source-contact surface, the source-backing surface, and the member such that a horizontal edge of the source different from the leading edge is supported along the member.

6. The method of claim 5, further comprising spatially arranging the flap and the housing wherein pressure is applied to a non-scan surface of the source and the scan surface of the source closely contacts the transparent platen portion.

7. The method of claim 6, further comprising enabling the optical scanner to scan the source.

8. The method of claim 7, further comprising spatially arranging the flap and the housing wherein pressure is removed from the non-scan surface of the source.

9. The method of claim 8, further comprising removing the source from the aperture.

10. A space-saving scanner assembly, comprising:
a housing having a substantially vertical source-contact surface;
a member forming a channel protruding from the housing; and
a flap coupled to the housing, the flap having a source-backing surface substantially parallel to the source-contact surface of the housing, wherein the source-contact surface, the source-backing surface, and the member form an aperture for horizontally receiving a source to be scanned without necessitating relative movement between the flap and the housing, wherein the flap comprises a slot.

11. The assembly of claim 10, wherein the slot is positioned to permit the placement of a relatively short source document on edge on said member and wherein information to be scanned from the source document is aligned with at least a portion of a platen.

12. A method for arranging a source in a scanner comprising:
horizontally inserting a leading edge of the source into an aperture formed by a member that protrudes from a housing such that a second edge of the source, different from the leading edge, is supported by a base of said member, said base having a width that varies along the length of the member; and
adjusting the source such that information desired to be imaged is aligned with a sensor of the scanner.

13. The method of claim 12, further comprising:
inserting a plug into a slot formed in a flap, the flap substantially parallel with a platen of the scanner; and
enabling the sensor to scan the information.

14. The method of claim 13, further comprising:
removing the plug; and
removing the source from the aperture.

15. A space-saving scanner assembly, comprising:
a housing having a substantially vertical source-contact surface;
a flap coupled to the source-contact surface the flap having a source-backing surface substantially parallel to the source-contact surface of the housing, wherein the flap comprises a slot; and
a support member interposed between said housing and said flap and extending to a front panel of the housing, wherein the source-contact surface, the source-backing surface, and said support member form an aperture for horizontally receiving a source to be scanned without necessitating relative movement between the flap and the housing.

16. The assembly of claim 15, wherein the slot is positioned to permit the placement of a relatively short source document on edge on said support member wherein information to be scanned is aligned with at least a portion of a platen.

17. A space-saving scanner assembly, comprising:
means for housing an optical scanning means; and
means for forming an aperture configured to closely receive a leading edge of a source transferred horizontally along a plane substantially orthogonal to a front surface of the means for housing, such that the source can be spatially arranged with the optical scanning means without adjusting the aperture, the source being supported along a second edge of said source by a support means in the aperture, said support means extending to a front panel of the means for housing, wherein said support means is interposed between a first source-retaining means and said optical scanning means, and the first source retaining means comprises a flap having a slot.

18. A space-saving scanner assembly, comprising:
a housing having a substantially vertical source-contact surface comprising a platen;
a flap coupled to the housing, the flap having a source-backing surface substantially parallel to the source-contact surface of the housing, wherein the flap comprises a slot; and
a support member interposed between the source-contact surface and the source-backing surface proximal to a perimeter segment of the platen, wherein the source-contact surface, the source-backing surface, and the support member form an aperture for receiving a first edge of a source moved horizontally without necessitating relative movement between the flap and the housing to align a second edge of the source with the perimeter segment of the platen.

19. The assembly of claim 18, wherein the slot is positioned to permit the placement of a relatively short source document on said support member and wherein information to be scanned from the source document is aligned with at least a portion of the platen.

\* \* \* \* \*

UNITED STATES PATENT AND TRADEMARK OFFICE
CERTIFICATE OF CORRECTION

PATENT NO. : 8,536,513 B2  
APPLICATION NO. : 09/885900  
DATED : September 17, 2013  
INVENTOR(S) : Scott Baggs Page 1 of 1

It is certified that error appears in the above-identified patent and that said Letters Patent is hereby corrected as shown below:

In the Specification:

In column 10, line 1, delete "hinge" and insert -- hinge 925 --, therefor.

In the Claims:

In column 11, line 1, in Claim 1, delete "surface" and insert -- surface, --, therefor.

In column 12, line 25, in Claim 15, delete "surface" and insert -- surface, --, therefor.

Signed and Sealed this  
Tenth Day of December, 2013

Margaret A. Focarino  
*Commissioner for Patents of the United States Patent and Trademark Office*